(12) United States Patent
Kulkarni et al.

(10) Patent No.: US 11,740,789 B2
(45) Date of Patent: Aug. 29, 2023

(54) AUTOMATED STORAGE CAPACITY PROVISIONING USING MACHINE LEARNING TECHNIQUES

(71) Applicant: EMC IP Holding Company LLC, Hopkinton, MA (US)

(72) Inventors: Shashidhar R. Kulkarni, Bangalore (IN); Karthik Mani, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 183 days.

(21) Appl. No.: 16/876,323

(22) Filed: May 18, 2020

(65) Prior Publication Data

US 2021/0357123 A1    Nov. 18, 2021

(51) Int. Cl.
*G06F 3/06* (2006.01)
*G06N 20/00* (2019.01)
*G06N 7/01* (2023.01)

(52) U.S. Cl.
CPC ............ *G06F 3/0605* (2013.01); *G06F 3/067* (2013.01); *G06F 3/0629* (2013.01); *G06N 7/01* (2023.01); *G06N 20/00* (2019.01)

(58) Field of Classification Search
CPC ...... G06F 3/0605; G06F 3/0629; G06N 20/00
See application file for complete search history.

(56) References Cited

U.S. PATENT DOCUMENTS

| 4,709,367 | A  | 11/1987 | Grafe |
| 5,953,729 | A  | 9/1999  | Cabrera |
| 8,589,617 | B2 | 11/2013 | Maeda |
| 8,886,911 | B2 | 11/2014 | Nemazie |
| 9,104,971 | B1 * | 8/2015 | Chamness .............. G06Q 30/02 |
| 9,646,256 | B2 | 5/2017  | Chamness |
| 10,535,011 | B2 | 1/2020 | Cohen |
| 10,656,869 | B1 | 5/2020 | Greenwood |

(Continued)

OTHER PUBLICATIONS

Dell EMC CloudIQ Detailed Review, A Proactive Monitoring and Analytics Application for Dell EMC Storage Systems, Jun. 2019.

(Continued)

*Primary Examiner* — Baboucarr Faal
(74) *Attorney, Agent, or Firm* — Ryan, Mason & Lewis, LLP (57) ABSTRACT

Methods, apparatus, and processor-readable storage media for automated storage capacity provisioning using machine learning techniques are provided herein. An example computer-implemented method includes obtaining a user-provided input comprising an identification of an amount of storage capacity to be provisioned from a storage system; determining an amount of time for which the amount of storage capacity to be provisioned will last in connection with the storage system by processing the user-provided input in connection with historical data pertaining to storage utilization using one or more machine learning techniques; outputting, to the user, the determined amount of time for which the amount of storage capacity to be provisioned will last; and performing one or more automated actions based at least in part on feedback from the user in response to the outputting of the determined amount of time for which the amount of storage capacity to be provisioned will last.

20 Claims, 9 Drawing Sheets

(56) References Cited

U.S. PATENT DOCUMENTS

| | | |
|---|---|---|
| 10,810,054 B1 | 10/2020 | Martinez Lerin |
| 2004/0078376 A1 | 4/2004 | Kusama et al. |
| 2006/0282637 A1 | 12/2006 | Yamauchi et al. |
| 2008/0082726 A1 | 4/2008 | Elhamias |
| 2009/0083511 A1 | 3/2009 | Kanda et al. |
| 2009/0272099 A1 | 11/2009 | Garimella |
| 2010/0042629 A1 | 2/2010 | Fukatani et al. |
| 2010/0211620 A1 | 8/2010 | Matsuzawa et al. |
| 2012/0017567 A1 | 1/2012 | Geveci |
| 2012/0150764 A1 | 6/2012 | Sadegh |
| 2012/0151120 A1 | 6/2012 | Post |
| 2013/0179648 A1* | 7/2013 | Yagame ............... G06F 3/0685 711/E12.001 |
| 2014/0047208 A1 | 2/2014 | Morse |
| 2015/0293815 A1 | 10/2015 | Harel |
| 2016/0246812 A1 | 8/2016 | Barajas Gonzalez et al. |
| 2016/0321115 A1* | 11/2016 | Thorpe ............. G06Q 10/0631 |
| 2017/0060769 A1 | 3/2017 | Wires |
| 2017/0160957 A1 | 6/2017 | Thangaraj |
| 2017/0160976 A1 | 6/2017 | Thangaraj |
| 2017/0374147 A1 | 12/2017 | McNair et al. |
| 2018/0150224 A1 | 5/2018 | You |
| 2018/0150244 A1 | 5/2018 | Caporale et al. |
| 2018/0262413 A1 | 9/2018 | Sureka |
| 2019/0056877 A1 | 2/2019 | Koleshik |
| 2019/0073297 A1 | 3/2019 | Goss |
| 2019/0155698 A1 | 5/2019 | Shekhar et al. |
| 2019/0294333 A1 | 9/2019 | Zaidman |
| 2019/0332486 A1 | 10/2019 | Aseev |
| 2020/0012443 A1 | 1/2020 | Chen |
| 2020/0379670 A1 | 12/2020 | Zheng |
| 2020/0409588 A1 | 12/2020 | Zaidman |
| 2021/0011830 A1* | 1/2021 | Khokhar ............... G06F 3/0604 |

OTHER PUBLICATIONS

QNAP Systems, Inc., Threshold Warning; How to Disable Threshold Warning from Volume Management, http://qnapsupport.net/threshold-warning-how-to-disable-threshold-warning-from-volume-managment/, Oct. 3, 2019.

Dell EMC, Technical White Paper, Dell EMC Unity: Introduction to the Platform, Dec. 2019.

Dell Technologies, Best Practices, Dell EMC Unity; Best Practices Guide, Mar. 2020.

U.S. Appl. No. 16/860,749, filed Apr. 28, 2020, entitled "Automatic Management of File System Capacity Using Predictive Analytics for a Storage System."

* cited by examiner

FIG. 1

```
# imports
import numpy as np
import matplotlib.pyplot as plt
from sklearn.linear_model import LinearRegression
from sklearn.metrics import mean_squared_error, r2_score importing csv module
import csv csv file name
filename = "storage_utilization.csv"

# initializing the titles and rows list
fields = []
rows = []
count = 0
y = []
x = []
cnt = 0 reading csv file
with open(filename, 'r') as csvfile:
    # creating a csv reader object
    csvreader = csv.reader(csvfile)

header = next(csvreader)

for line in csvreader:
        if line[1]:
            int_storage = [int(line[1])]
            y.append(int_storage)
    #print (y)
```

FIG. 3

```
# reading csv file
with open(filename, 'r') as csvfile:
    # creating a csv reader object
    csvreader = csv.reader(csvfile)

header = next(csvreader)

for line in csvreader:
        if line[0]:
            cnt = cnt + 1 int_storage = [cnt]
            x.append(int_storage)

print (x[0])
print (y[0])

a = np.asarray([x])
b = np.asarray([y])

# generate random data-set
#np.random.seed(0)
#x = np.random.rand(100, 1)
#y = 2 + 3 * x + np.random.rand(100, 1)

#print(x[0])
#print(y[0])
```

FIG. 3 (cont.)

```
# sckit-learn implementation

# Model initialization
regression_model = LinearRegression()
# Fit the data(train the model)
regression_model.fit(x, y)

# Predict
y_predicted = regression_model.predict(x)

# model evaluation
rmse = mean_squared_error(y, y_predicted)
r2 = r2_score(y, y_predicted)

# printing values
print('Slope:' ,regression_model.coef_)
print('Intercept:', regression_model.intercept_)
print('Root mean squared error: ', rmse)
print('R2 score: ', r2)

plotting values data points
plt.scatter(x, y, s=10)
plt.xlabel('Months')
plt.ylabel('Storage Utilization')

# predicted values
plt.plot(x, y_predicted, color='r')
plt.show()
```

```
def runningSums(lst):
    res = [lst[0]]
    for elem in lst[1:]:
        res.append(res[-1] + elem)
    return res
def antiRunningSums(lst):
    res = [lst[0]]
    for i in range(1,len(lst)):
        res.append(lst[i] - lst[i-1])
    return res
def predict(lst):
    deriv = 0
    while True:
        nxt = antiRunningSums(lst)
        if sum(map(abs, nxt)) > sum(map(abs, lst)):
            break
        lst = nxt
        deriv += 1
    lst.append(lst[-1])
    for i in range(deriv):
        lst = runningSums(lst)
    return lst

# Example call. Correctly gives back [1,4,9,16,25,36,49].
#pred = predict([[1,4,9,16,25,36]])
#pred = predict([[1,2,3,4,5,6]])
pred = predict([2,5,8,11,14,17])
print(pred)
```

AUTOMATED STORAGE CAPACITY PROVISIONING USING MACHINE LEARNING TECHNIQUES

FIELD

The field relates generally to information processing systems, and more particularly to storage in such systems.

BACKGROUND

A common task performed by storage administrators includes storage capacity expansion based on alerts generated in connection with a given storage-related threshold. However, conventional storage management approaches have difficulty determining an appropriate amount of storage capacity to be provisioned in response to such alerts. Additionally, many capacity planning errors and/or imperfections are overlooked because of thin provisioning. For example, conventional approaches typically require administrators to rely on their existing knowledge of storage utilization, which commonly results in errors and/or inefficient allocation of storage resources.

SUMMARY

Illustrative embodiments of the disclosure provide techniques for automated storage capacity provisioning using machine learning techniques. An exemplary computer-implemented method includes obtaining a user-provided input comprising an identification of an amount of storage capacity to be provisioned from at least one storage system, and determining an amount of time for which the amount of storage capacity to be provisioned will last in connection with at least one volume by processing the user-provided input in connection with historical data pertaining to storage utilization using one or more machine learning techniques. The method also includes outputting, to the user, the determined amount of time for which the amount of storage capacity to be provisioned will last, and performing one or more automated actions based at least in part on feedback from the user in response to the outputting of the determined amount of time for which the amount of storage capacity to be provisioned will last.

Illustrative embodiments can provide significant advantages relative to conventional storage management approaches. For example, problems associated with uncertainty arising from determining appropriate amounts of storage capacity to provision in response to a capacity alert are overcome in one or more embodiments through automatically determining storage capacity amounts to be provisioned, in response to specific user inputs, using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
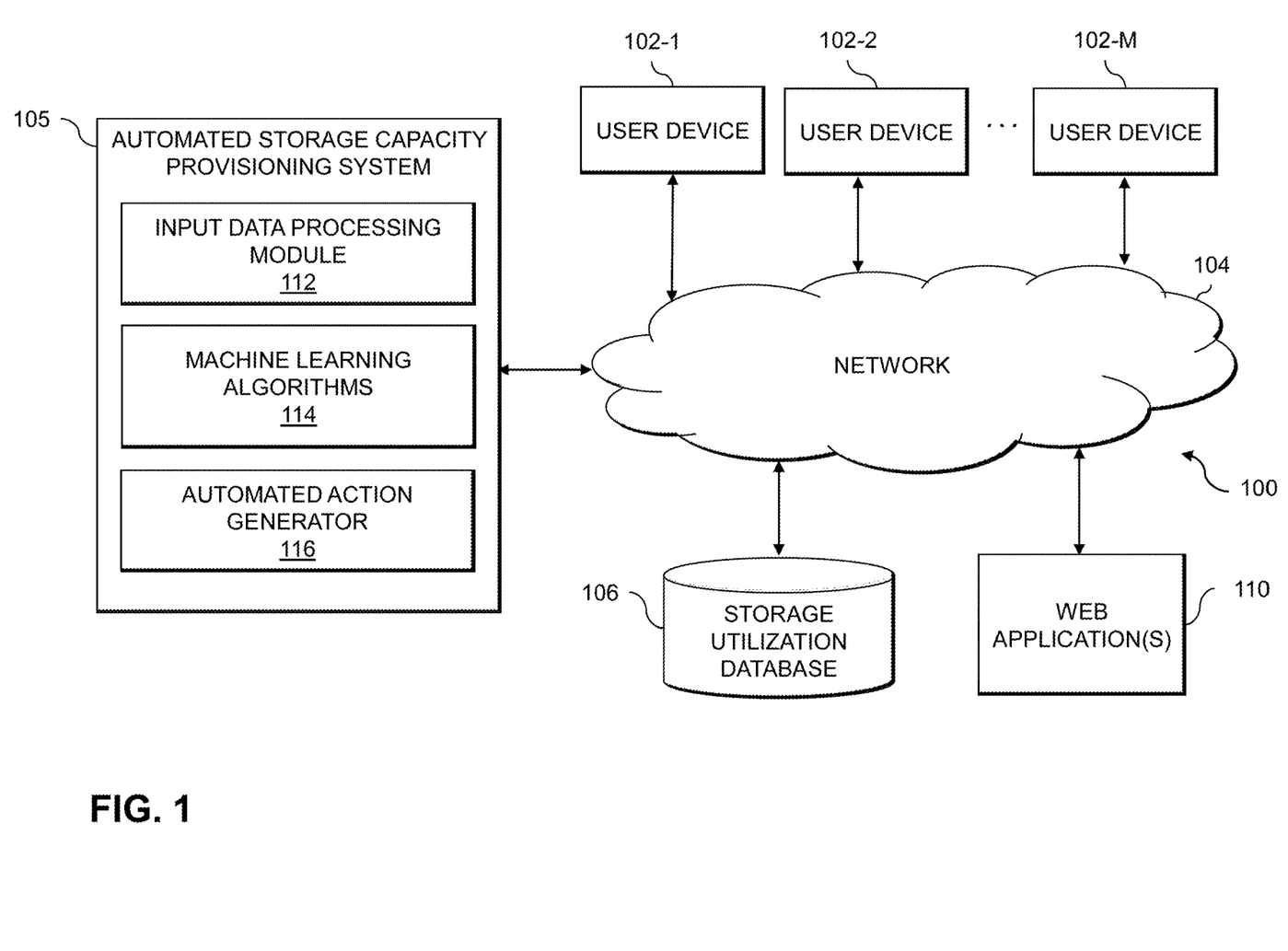
FIG. 1 shows an information processing system configured for automated storage capacity provisioning using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated storage capacity provisioning system 105 and one or more web applications 110 (e.g., applications pertaining to storage capacity provisioning, storage planning, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated storage capacity provisioning system 105 can have an associated database 106 configured to store data pertaining to storage utilization, which comprise, for example, various temporally-associated storage utilization metrics for one or more storage systems and/or devices.

The database 106 in the present embodiment is implemented using one or more storage systems associated with the automated storage capacity provisioning system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated storage capacity provisioning system 105 can be input-output devices, which illustratively comprise keyboards, displays or other types of input-output devices in any combination. Such input-output devices can be used, for example, to support one or more user interfaces to the automated storage capacity provisioning system 105, as well as to support communication between the automated storage capacity provisioning system 105 and other related systems and devices not explicitly shown.

Additionally, the automated storage capacity provisioning system 105 in the FIG. 1 embodiment is assumed to be implemented using at least one processing device. Each such processing device generally comprises at least one processor and an associated memory, and implements one or more functional modules for controlling certain features of the automated storage capacity provisioning system 105.

More particularly, the automated storage capacity provisioning system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated storage capacity provisioning system 105 to communicate over the network 104 with the user devices 102, and illustratively comprises one or more conventional transceivers.

The automated storage capacity provisioning system 105 further comprises an input data processing module 112, machine learning algorithms 114, and an automated action generator 116.

It is to be appreciated that this particular arrangement of modules 112, 114 and 116 illustrated in the automated storage capacity provisioning system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automated storage capacity provisioning using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example automated storage capacity provisioning system 105 in computer network 100 will be described in more detail with reference to the flow diagram of FIG. 5.

Accordingly, at least one embodiment includes automated storage capacity provisioning using machine learning techniques. An example embodiment includes using predictive analytics and linear regression techniques in connection with historical data pertaining to storage utilization to aid in capacity planning for storage administrators. Such aid can come, for instance, in the form of future storage capacity requirement determinations.

By way of example, at least one embodiment includes processing existing historical data using linear regression techniques and predictive analytics to determine a storage allocation that can last for a deterministic duration of time. Specifically, in one such embodiment, linear regression techniques and predictive analytics are triggered in response to a user (for example, a storage administrator) selecting or inputting a storage expansion size (e.g., in gigabytes (GB), terabytes (TB), etc.). The linear regression techniques and predictive analytics are then applied to relevant historical data to generate a deterministic duration for which the selected and/or input storage expansion size will last, and such a deterministic duration is output to the user.

Additionally or alternatively, one or more embodiments include provisioning storage based at least in part on the deterministic duration that the additional storage is needed rather than based on estimations of storage capacity to be added. Accordingly, in such an embodiment, a user (e.g., a storage administrator) provides input in the form of a duration of time for which additional storage is needed to last, and linear regression techniques and predictive analytics are implemented in connection with historical data to predict the required storage amount to be provisioned (to and/or from one or more storage systems) to satisfy the durational demands of the user.

As detailed herein, at least one embodiment includes generating and/or implementing at least one machine learning storage prediction algorithm. In such an embodiment, data used for generating and/or training the prediction algorithm(s) are collected using one or more storage resource management applications. At least a portion of such data is then fed to a linear regression algorithm, which helps to remove noise from the collected data. Subsequently, the remaining and/or output data from the linear regression algorithm are provided to a machine learning prediction algorithm.

In one or more embodiments, as part of such a machine learning prediction algorithm, predictive analytics are executed on the values of the linear regression algorithm output to estimate at least one trend for a given duration of time (e.g., the next day, the next week, the next month, the next year, etc.). Input data collected and/or utilized in a given embodiment can vary, for example, according to the duration of time for which the storage provision is to be predicted. By way merely of illustration, if the prediction is to be made for additional storage to last for the next year, then yearly data samples are collected and/or utilized to predict the utilization for the next year.

Accordingly, one or more embodiments include using an amount value entered by a user (e.g., storage administrator) along with related values generated via predictive analytics to calculate the duration that the given storage amount is anticipated to last. In such an embodiment, predictive analytics are implemented to calculate storage utilization values for various durations, and such calculations can be used in connection with the above determination(s) and output to the user for assistance in future capacity planning.

Figure 2:
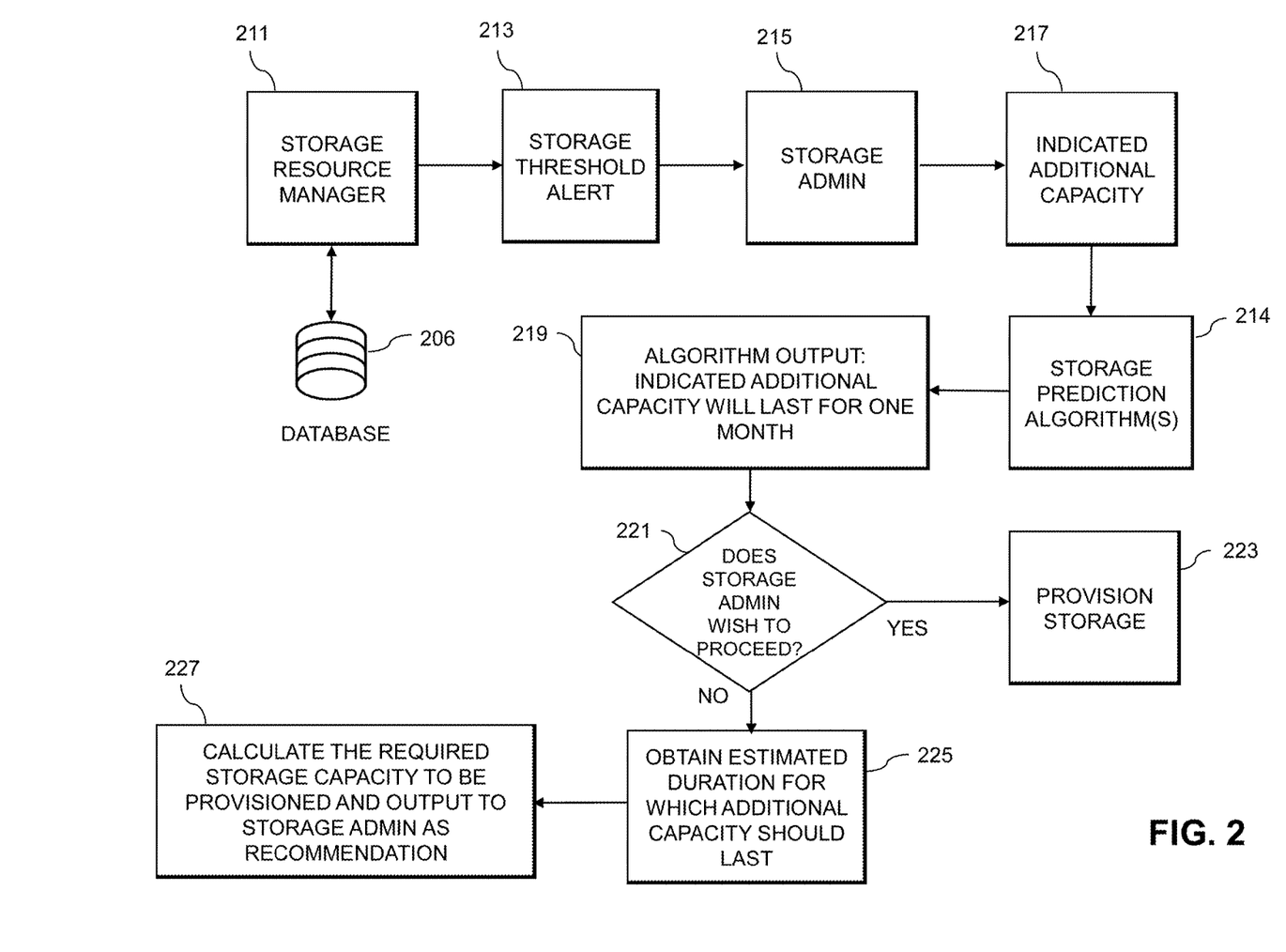
FIG. 2 shows an example workflow for automated storage capacity provisioning using machine learning techniques in an illustrative embodiment.

FIG. 2 shows an example workflow for automated storage capacity provisioning using machine learning techniques in an illustrative embodiment. By way of illustration, FIG. 2 depicts a storage resource manager 211, an application that monitors storage usage within at least one storage system, and which can generate storage threshold alerts 213 based on the monitoring of data utilization in conjunction with historic data derived from database 206. The storage resource manager 211 can output such alerts 213 to a storage administrator (admin) 215. Based at least in part on the alert 213, the storage administrator (admin) 215 selects or otherwise indicates an amount of additional storage capacity 217 to be provisioned from a given one or more storage systems.

That indication 217 is fed to one or more machine learning storage prediction algorithms 214, which processes the input indication 217 (in conjunction with historic storage utilization data) and generates an output 219 which includes a determination that the indicated amount of storage capacity to be provisioned will last for a given amount of time (e.g., one month). A prompt 221 is then output to the storage administrator querying whether the storage administrator would like to proceed with the provisioning in light of the temporal determination generated by the machine learning storage prediction algorithm(s). If the storage administrator responds "yes," then the indicated storage capacity is provisioned from the given one or more storage systems in step 223. If the storage administrator responds "no," then the storage administrator is queried to provide an amount of time 225 for which additional storage capacity should properly last. Based at least in part on this information, the required amount of storage capacity 227 to meet this temporal requirement is calculated and output to the storage administrator as a recommendation.

As detailed herein, one or more embodiments include reducing or avoiding under- or over-provisioning of storage as a result of the machine learning-based provisioning optimization techniques. In accordance with such embodiments, storage administrators will have increased clarity and/or certainty with respect to how long provisioned additional storage capacity will last, facilitating and/or rendering more efficient storage planning efforts. Also, in at least one embodiment, provisioning can be carried out within stipulated limits of thin provisioning. Additionally or alternatively, one or more embodiments can be implemented in connection with scenarios wherein different volumes grow at different rates. For instance, such an embodiment provides storage administrators with flexibility to grow certain volumes based on their criticality (e.g., for some volumes, a storage administrator may want four months of coverage, while for other volumes, the storage administrator may want eight months of coverage).

Figure 3:
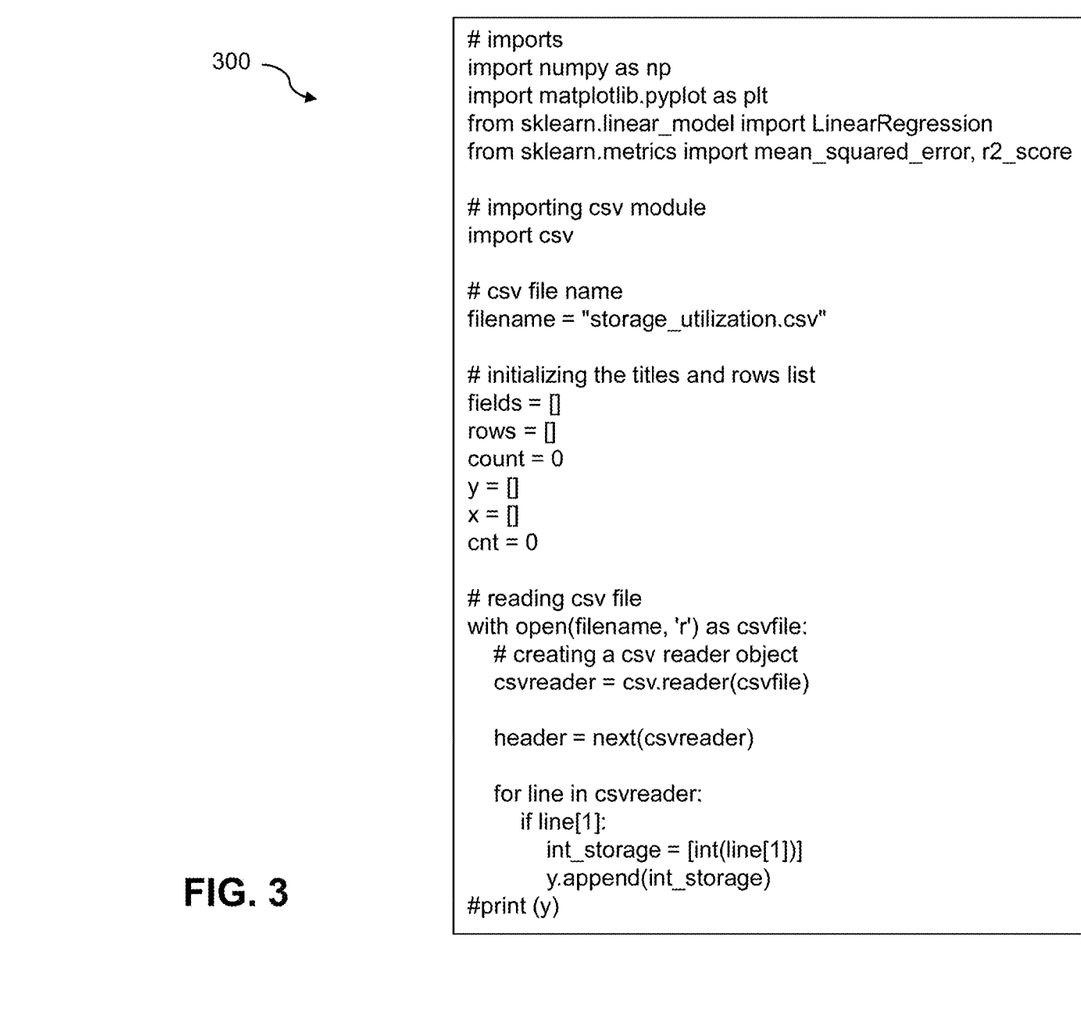
FIG. 3 shows example code snippets for implementing at least a portion of a linear regression algorithm in an illustrative embodiment.

FIG. 3 shows example code snippets for implementing at least a portion of a linear regression algorithm in an illustrative embodiment. In this embodiment, example code snippets 300 are executed by or under the control of at least one processing system and/or device. For example, the example code snippets 300 may be viewed as comprising a portion of a software implementation of at least part of automated storage capacity provisioning system 105 of the FIG. 1 embodiment.

The example code snippets 300 illustrate steps to import required library files, and read a "storage_utilization.csv" file that contains the relevant data. Here, the data symbolize the values held in a storage resource manager database. Example code snippets 300 further illustrate steps to generate csv.reader objects, and use a linear regression for generating linear data from scattered data. Additionally, code snippets 300 also illustrate initializing a linear regression model, fitting the data in to the model's x and y coordinates, using a predict function from the linear regression library to generate root mean squared values, and, from matplotlib.pyplot, plotting the generated x and y coordinate vales.

It is to be appreciated that the particular example code snippets show just one example implementation of a portion of a linear regression algorithm, and alternative implementations of the process can be used in other embodiments.

Figure 4:
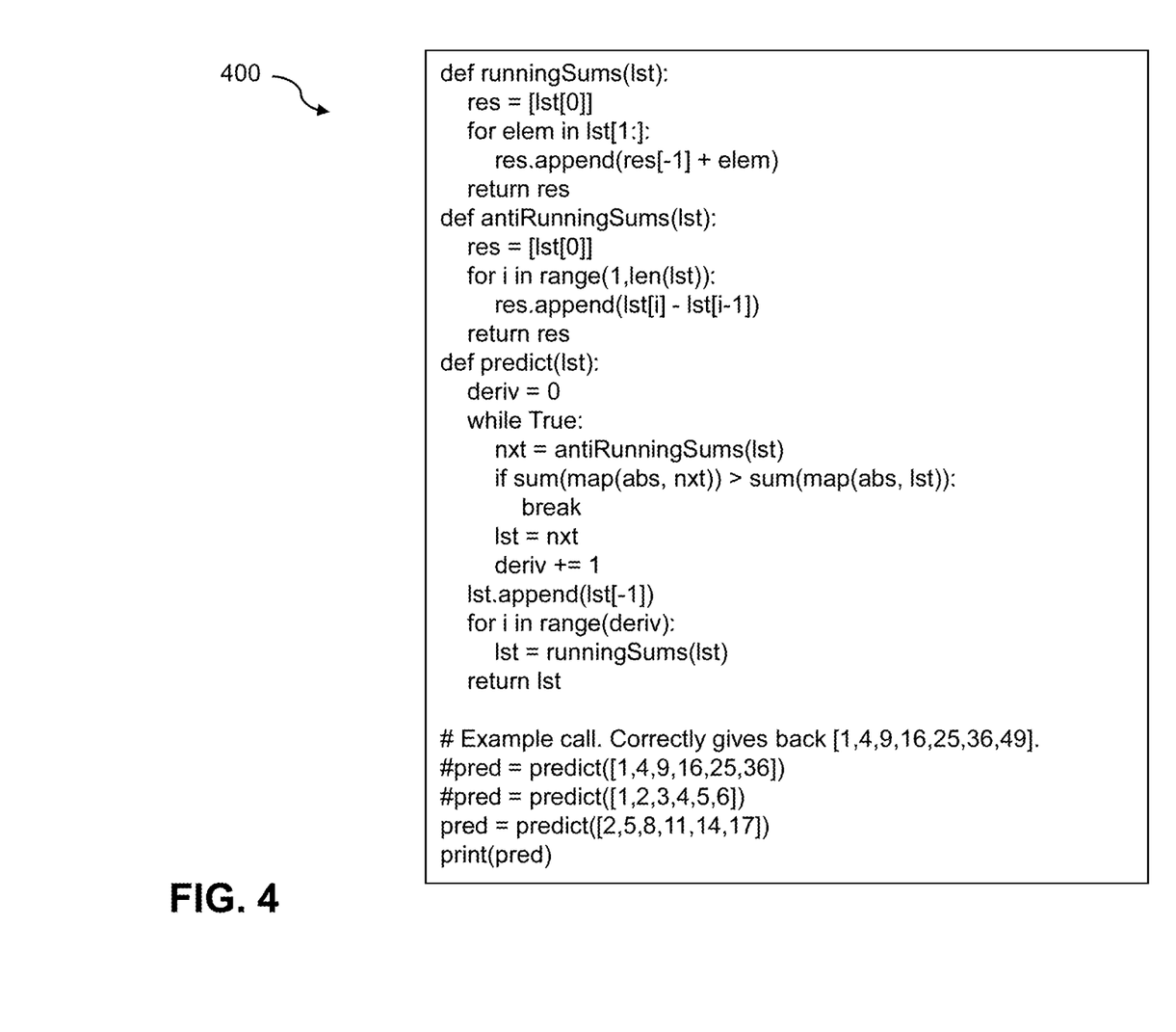
FIG. 4 shows example code snippets for implementing at least a portion of a predictive analytics algorithm in an illustrative embodiment.

FIG. 4 shows example code snippets for implementing at least a portion of a predictive analytics algorithm in an illustrative embodiment. In this embodiment, example code snippets 400 are executed by or under the control of at least one processing system and/or device. For example, the example code snippets 400 may be viewed as comprising a portion of a software implementation of at least part of automated storage capacity provisioning system 105 of the FIG. 1 embodiment.

The example code snippets 400 illustrate steps to pass the values generated in a linear regression to a function called predict( ), and calculate an anti-running sum of these values. This can include, for example, taking the first value and appending the difference between n and n−1, continuing this until all of the elements in the array are completed, and ultimately returning the anti-running sum. Example code snippets 400 also illustrate mapping and adding the anti-running sum(s) for all of the objects in the list of the linear regression, passing this list to runningSums( ), wherein each element is appended with the sum of its first and last element from the map. The resulting last number represents the predicted number.

It is to be appreciated that the particular example code snippets show just one example implementation of a portion of a predictive analytics algorithm, and alternative implementations of the process can be used in other embodiments.

Figure 5:
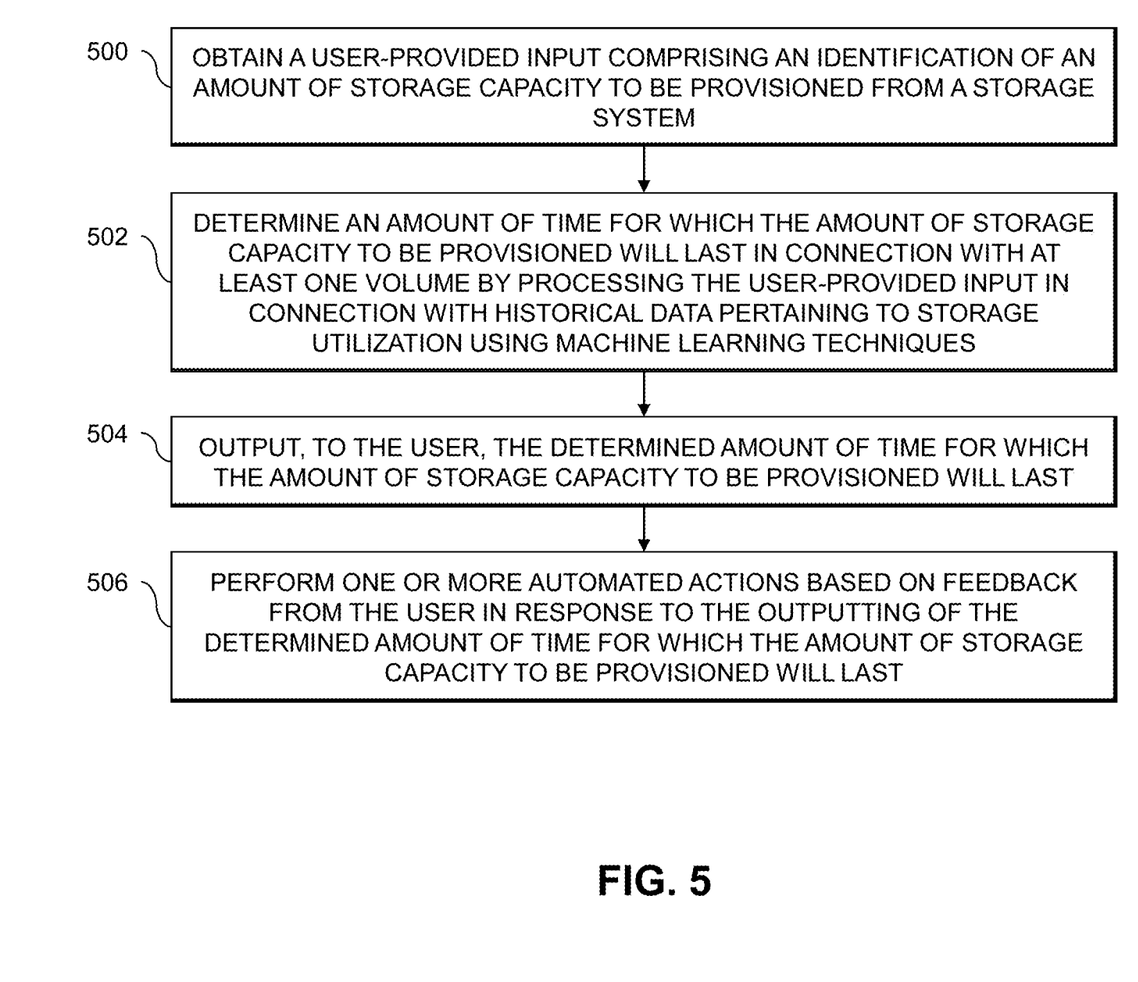
FIG. 5 is a flow diagram of a process for automated storage capacity provisioning using machine learning techniques in an illustrative embodiment.

FIG. 5 is a flow diagram of a process for automated storage capacity provisioning using machine learning techniques in an illustrative embodiment. It is to be understood that this particular process is only an example, and additional or alternative processes can be carried out in other embodiments.

In this embodiment, the process includes steps 500 through 506. These steps are assumed to be performed by the automated storage capacity provisioning system 105 utilizing its modules 112, 114 and 116.

Step 500 includes obtaining a user-provided input comprising an identification of an amount of storage capacity to be provisioned from at least one storage system (e.g., to at least one volume). Step 502 includes determining an amount of time for which the amount of storage capacity to be provisioned will last in connection with at least one volume by processing the user-provided input in connection with historical data pertaining to storage utilization using one or more machine learning techniques. In at least one embodiment, processing the user-provided input in connection with historical data pertaining to storage utilization using one or more machine learning techniques includes feeding the user-provided input to at least one linear regression algorithm and generating an output modeling a relationship between the user-provided input and one or more temporal values. Such an embodiment can also include executing one or more predictive analytics techniques on at least a portion of the output generated by the at least one linear regression algorithm, thereby estimating at least one storage-related trend for at least one temporal duration.

Step 504 includes outputting, to the user, the determined amount of time for which the amount of storage capacity to be provisioned will last. Step 506 includes performing one or more automated actions based at least in part on feedback from the user in response to the outputting of the determined amount of time for which the amount of storage capacity to be provisioned will last. In at least one embodiment, performing the one or more automated actions includes, in response to negative feedback from the user in response to the outputting of the determined amount of time for which the amount of storage capacity to be provisioned will last, querying the user for a duration of time for which an amount of storage capacity to be provisioned from the at least one storage system needs to last. Such an embodiment can also include determining an amount of storage capacity to be provisioned from the at least one storage system sufficient to last for the duration of time provided by the user in response to said querying, wherein determining the amount of storage capacity to be provisioned comprises processing the duration of time provided by the user in connection with historical data pertaining to storage utilization within one or more temporal constraints using the one or more machine learning techniques. Additionally or alternatively, such an embodiment can include outputting, to at least one storage capacity planning system, the determined amount of storage capacity to be provisioned from the at least one storage system sufficient to last for the duration of time provided by the user. Further, in such an embodiment, the historical data pertaining to storage utilization within one or more temporal constraints can include historical data pertaining to storage utilization encompassing a duration of time approximate to the duration of time provided by the user.

Additionally or alternatively, in at least one embodiment, performing the one or more automated actions includes, in response to positive feedback from the user in response to the outputting of the determined amount of time for which the amount of storage capacity to be provisioned will last, provisioning the amount of storage capacity corresponding to the user-provided input. Alternatively, in one or more embodiments, performing the one or more automated actions can include, in response to negative feedback from the user in response to the outputting of the determined amount of time for which the amount of storage capacity to be provisioned will last, querying the user for multiple durations of time for which an amount of storage capacity to be provisioned across multiple storage volumes within the at least one storage system needs to last.

Also, the techniques depicted in FIG. 5 can additionally include determining multiple amounts of storage capacity to be provisioned to the multiple storage volumes (e.g., from a storage array) within at least one storage system sufficient to last for the multiple durations of time provided by the user in response to said querying, wherein determining the multiple amounts of storage capacity to be provisioned comprises processing the multiple durations of time provided by the user in connection with historical data pertaining to storage utilization within one or more temporal constraints using the one or more machine learning techniques.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine storage capacity amounts to be provisioned, in response to specific user inputs, using machine learning techniques. These and other embodiments can effectively overcome problems associated with uncertainty arising from determining appropriate amounts of storage capacity to be provisioned in response to a capacity alert.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
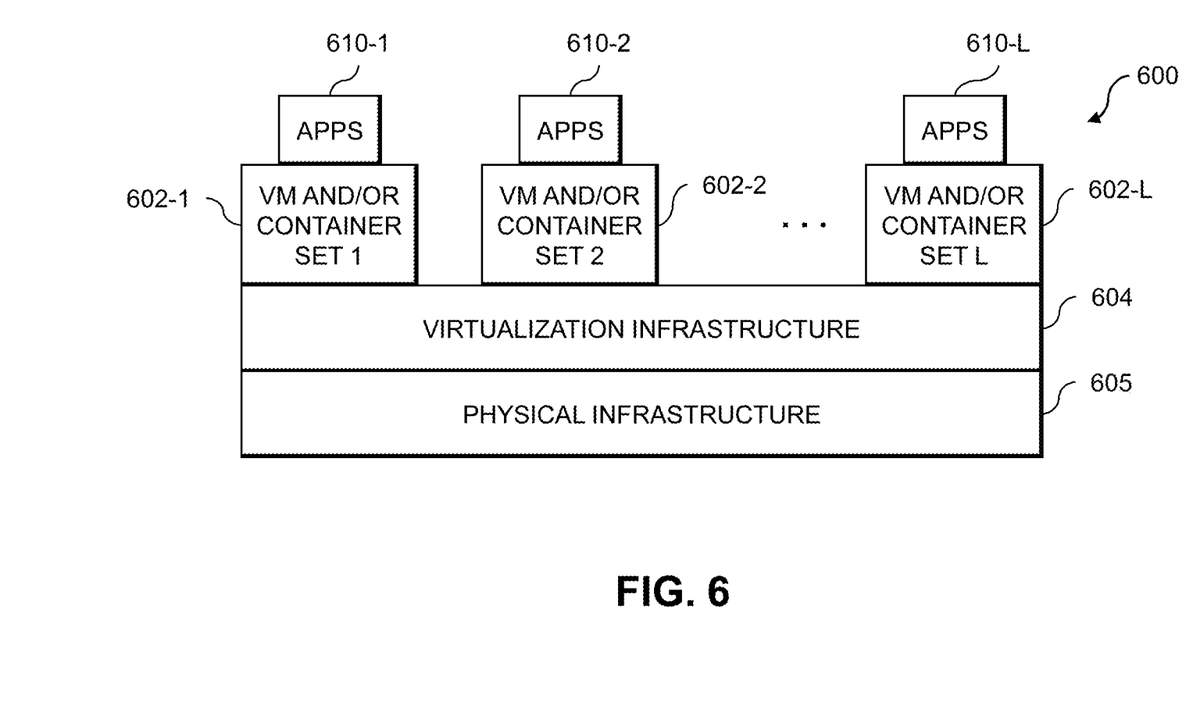
FIGS. 6 and 7 show examples of processing platforms that may be utilized to implement at least a portion of an information processing system in illustrative embodiments.
Figure 7:
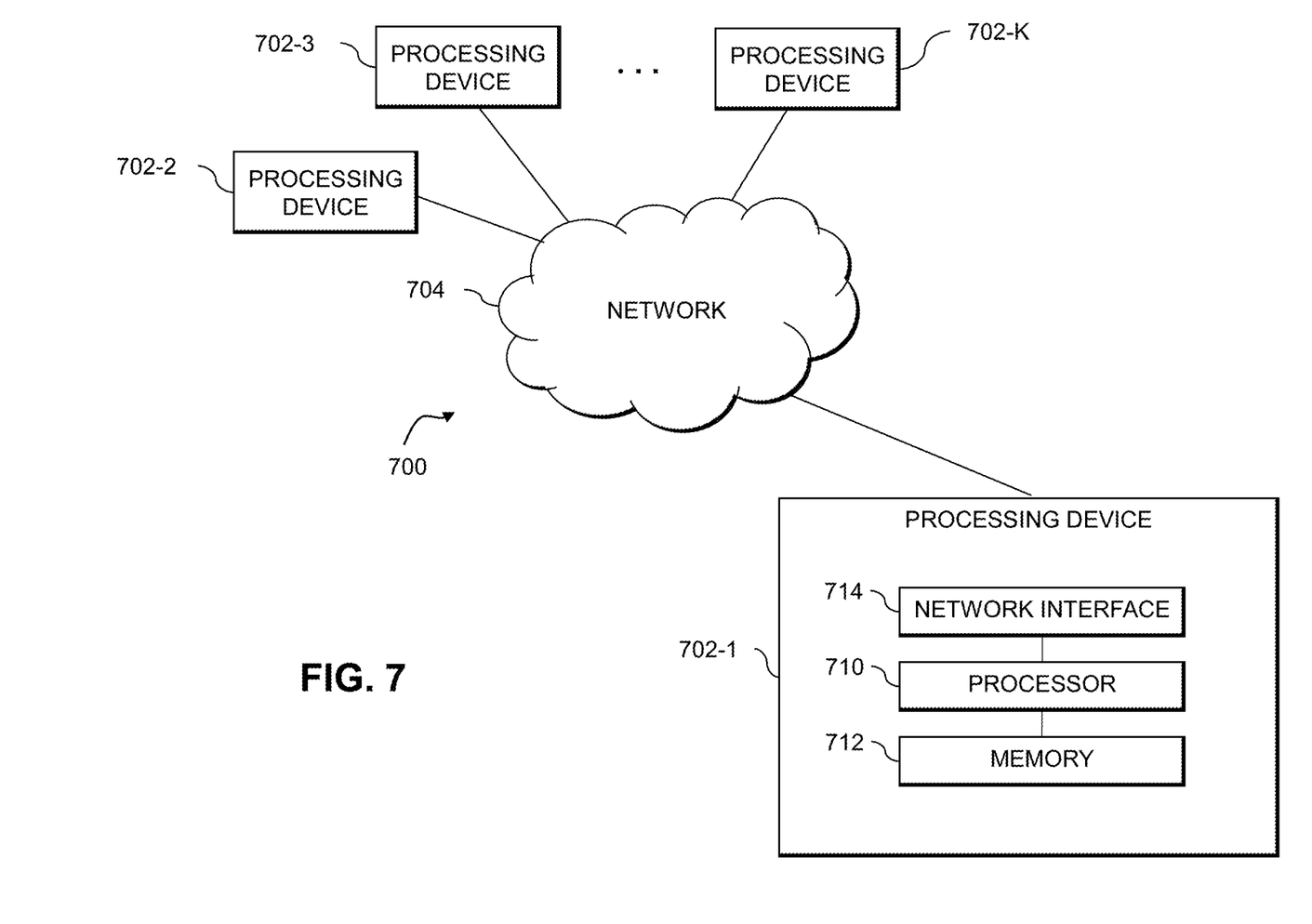

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining a user-provided input comprising an identification of an amount of storage capacity to be provisioned from at least one storage system;
    determining an amount of time for which the amount of storage capacity to be provisioned will last in connection with at least one volume by processing the user-provided input, in connection with historical data pertaining to storage utilization, using one or more machine learning techniques, wherein processing the user-provided input comprises:
        generating an output modeling at least one relationship between at least a portion of the user-provided input and one or more temporal values by processing at least a portion of the user-provided input using at least one regression technique; and
        determining at least one storage-related trend for at least one temporal duration by processing at least a portion of the output, generated by the at least one regression technique, using one or more machine learning-based prediction techniques;
    outputting, to the user, information pertaining to the determined amount of time for which the amount of storage capacity to be provisioned will last; and
    performing one or more automated actions based at least in part on feedback from the user in response to the outputting of the information pertaining to the determined amount of time for which the amount of storage capacity to be provisioned will last, wherein performing one or more automated actions comprises automatically provisioning at least a portion of the amount of storage capacity corresponding to the user-provided input;
    wherein the method is performed by at least one processing device comprising a processor coupled to a memory.

2. The computer-implemented method of claim 1, wherein performing the one or more automated actions comprises, in response to negative feedback from the user in response to the outputting of the determined amount of time for which the amount of storage capacity to be provisioned will last, querying the user for a duration of time for which an amount of storage capacity to be provisioned from the at least one storage system needs to last.

3. The computer-implemented method of claim 2, further comprising:
    determining an amount of storage capacity to be provisioned from the at least one storage system sufficient to last for the duration of time provided by the user in response to said querying, wherein determining the amount of storage capacity to be provisioned comprises processing the duration of time provided by the user in connection with historical data pertaining to storage utilization within one or more temporal constraints using the one or more machine learning techniques.

4. The computer-implemented method of claim 3, further comprising:
    outputting, to at least one storage capacity planning system, the determined amount of storage capacity to be provisioned from the at least one storage system sufficient to last for the duration of time provided by the user.

5. The computer-implemented method of claim 3, wherein the historical data pertaining to storage utilization within one or more temporal constraints comprises historical data pertaining to storage utilization encompassing a duration of time approximate to the duration of time provided by the user.

6. The computer-implemented method of claim 1, wherein performing the one or more automated actions comprises, in response to positive feedback from the user in response to the outputting of the determined amount of time for which the amount of storage capacity to be provisioned will last, provisioning the amount of storage capacity corresponding to the user-provided input.

7. The computer-implemented method of claim 1, wherein performing the one or more automated actions comprises, in response to negative feedback from the user in response to the outputting of the determined amount of time for which the amount of storage capacity to be provisioned will last, querying the user for multiple durations of time for which an amount of storage capacity to be provisioned across multiple storage volumes within the at least one storage system needs to last.

8. The computer-implemented method of claim 7, further comprising:
    determining multiple amounts of storage capacity to be provisioned to the multiple storage volumes within at least one storage system sufficient to last for the multiple durations of time provided by the user in response to said querying, wherein determining the multiple amounts of storage capacity to be provisioned comprises processing the multiple durations of time provided by the user in connection with historical data pertaining to storage utilization within one or more temporal constraints using the one or more machine learning techniques.

9. A non-transitory processor-readable storage medium having stored therein program code of one or more software programs, wherein the program code when executed by at least one processing device causes the at least one processing device:
    to obtain a user-provided input comprising an identification of an amount of storage capacity to be provisioned from at least one storage system;
    to determine an amount of time for which the amount of storage capacity to be provisioned will last in connection with at least one volume by processing the user-provided input, in connection with historical data pertaining to storage utilization, using one or more machine learning techniques, wherein processing the user-provided input comprises:
        generating an output modeling at least one relationship between at least a portion of the user-provided input and one or more temporal values by processing at least a portion of the user-provided input using at least one regression technique; and
        determining at least one storage-related trend for at least one temporal duration by processing at least a portion of the output, generated by the at least one regression technique, using one or more machine learning-based prediction techniques;
    to output, to the user, information pertaining to the determined amount of time for which the amount of storage capacity to be provisioned will last; and
    to perform one or more automated actions based at least in part on feedback from the user in response to the outputting of the information pertaining to the determined amount of time for which the amount of storage capacity to be provisioned will last, wherein performing one or more automated actions comprises automatically provisioning at least a portion of the amount of storage capacity corresponding to the user-provided input.

10. The non-transitory processor-readable storage medium of claim 9, wherein performing the one or more automated actions comprises, in response to negative feedback from the user in response to the outputting of the determined amount of time for which the amount of storage capacity to be provisioned will last, querying the user for a duration of time for which an amount of storage capacity to be provisioned from the at least one storage system needs to last.

11. The non-transitory processor-readable storage medium of claim 10, wherein the program code when executed by the at least one processing device causes the at least one processing device:
    to determine an amount of storage capacity to be provisioned from the at least one storage system sufficient to last for the duration of time provided by the user in response to said querying, wherein determining the amount of storage capacity to be provisioned comprises processing the duration of time provided by the user in connection with historical data pertaining to storage utilization within one or more temporal constraints using the one or more machine learning techniques.

12. The non-transitory processor-readable storage medium of claim 9, wherein performing the one or more automated actions comprises, in response to positive feedback from the user in response to the outputting of the determined amount of time for which the amount of storage capacity to be provisioned will last, provisioning the amount of storage capacity corresponding to the user-provided input.

13. The non-transitory processor-readable storage medium of claim 9, wherein performing the one or more automated actions comprises, in response to negative feedback from the user in response to the outputting of the determined amount of time for which the amount of storage capacity to be provisioned will last, querying the user for multiple durations of time for which an amount of storage capacity to be provisioned across multiple storage volumes within the at least one storage system needs to last.

14. The non-transitory processor-readable storage medium of claim 13, wherein the program code when executed by the at least one processing device causes the at least one processing device:
    to determine multiple amounts of storage capacity to be provisioned to the multiple storage volumes within at least one storage system sufficient to last for the multiple durations of time provided by the user in response to said querying, wherein determining the multiple amounts of storage capacity to be provisioned comprises processing the multiple durations of time provided by the user in connection with historical data pertaining to storage utilization within one or more temporal constraints using the one or more machine learning techniques.

15. An apparatus comprising:
    at least one processing device comprising a processor coupled to a memory;
    the at least one processing device being configured:
        to obtain a user-provided input comprising an identification of an amount of storage capacity to be provisioned from at least one storage system;
        to determine an amount of time for which the amount of storage capacity to be provisioned will last in connection with at least one volume by processing the user-provided input, in connection with historical data pertaining to storage utilization, using one or more machine learning techniques, wherein processing the user-provided input comprises:
            generating an output modeling at least one relationship between at least a portion of the user-provided input and one or more temporal values by processing at least a portion of the user-provided input using at least one regression technique; and determining at least one storage-related trend for at least one temporal duration by processing at least a portion of the output, generated by the at least one regression technique, using one or more machine learning-based prediction techniques;

to output, to the user, information pertaining to the determined amount of time for which the amount of storage capacity to be provisioned will last; and to perform one or more automated actions based at least in part on feedback from the user in response to the outputting of the information pertaining to the determined amount of time for which the amount of storage capacity to be provisioned will last, wherein performing one or more automated actions comprises automatically provisioning at least a portion of the amount of storage capacity corresponding to the user-provided input.

16. The apparatus of claim 15, wherein performing the one or more automated actions comprises, in response to negative feedback from the user in response to the outputting of the determined amount of time for which the amount of storage capacity to be provisioned will last, querying the user for a duration of time for which an amount of storage capacity to be provisioned from the at least one storage system needs to last.

17. The apparatus of claim 16, wherein the at least one processing device being further configured:
to determine an amount of storage capacity to be provisioned from the at least one storage system sufficient to last for the duration of time provided by the user in response to said querying, wherein determining the amount of storage capacity to be provisioned comprises processing the duration of time provided by the user in connection with historical data pertaining to storage utilization within one or more temporal constraints using the one or more machine learning techniques.

18. The apparatus of claim 15, wherein performing the one or more automated actions comprises, in response to positive feedback from the user in response to the outputting of the determined amount of time for which the amount of storage capacity to be provisioned will last, provisioning the amount of storage capacity corresponding to the user-provided input.

19. The apparatus of claim 15, wherein performing the one or more automated actions comprises, in response to negative feedback from the user in response to the outputting of the determined amount of time for which the amount of storage capacity to be provisioned will last, querying the user for multiple durations of time for which an amount of storage capacity to be provisioned across multiple storage volumes within the at least one storage system needs to last.

20. The apparatus of claim 19, wherein the at least one processing device being further configured:
to determine multiple amounts of storage capacity to be provisioned to the multiple storage volumes within at least one storage system sufficient to last for the multiple durations of time provided by the user in response to said querying, wherein determining the multiple amounts of storage capacity to be provisioned comprises processing the multiple durations of time provided by the user in connection with historical data pertaining to storage utilization within one or more temporal constraints using the one or more machine learning techniques.

* * * * *